(12) United States Patent
Bernardini et al.

(10) Patent No.: US 12,419,271 B2
(45) Date of Patent: Sep. 23, 2025

(54) SUPPORT FOR DISPENSERS OF LIQUIDS FOR WATERING ANIMALS

(71) Applicant: TECNIPLAST S.P.A., Buguggiate (IT)

(72) Inventors: Pietro Bernardini, Casciago (IT);
Giovanni Malnati, Malnate (IT);
Mario Banfi, Cassano Magnago (IT)

(73) Assignee: TECNIPLAST S.P.A., Buguggiate (IT)

( * ) Notice: Subject to any disclaimer, the term of this patent is extended or adjusted under 35 U.S.C. 154(b) by 102 days.

(21) Appl. No.: 18/371,080

(22) Filed: Sep. 21, 2023

(65) Prior Publication Data

US 2024/0099263 A1   Mar. 28, 2024

(51) Int. Cl.
*A01K 1/03*   (2006.01)

(52) U.S. Cl.
CPC .................. *A01K 1/031* (2013.01)

(58) Field of Classification Search
CPC ......... A01K 1/031; A01K 1/0356; A01K 7/00
USPC ........................................... 119/72
See application file for complete search history.

(56) References Cited

U.S. PATENT DOCUMENTS

| | | | | |
|---|---|---|---|---|
| 4,373,471 A * | 2/1983 | Coulbourn | ............ | A01K 1/031 250/221 |
| 4,527,513 A * | 7/1985 | Hart | ............ | A01K 39/04 119/51.5 |
| 4,844,018 A * | 7/1989 | Niki | ............ | A01K 1/0356 119/72.5 |
| 5,009,194 A * | 4/1991 | Hostetler | ............ | A01K 39/0213 119/72 |
| 5,042,429 A * | 8/1991 | Deitrich | ............ | A01K 1/031 119/419 |
| 5,063,878 A * | 11/1991 | Hostetler | ............ | A01K 39/02 119/72 |
| 5,097,798 A * | 3/1992 | Little | ............ | A01K 39/02 248/58 |
| 5,105,770 A * | 4/1992 | Hostetler | ............ | A01K 39/0213 119/72 |
| 5,136,983 A * | 8/1992 | Hostetler | ............ | A01K 39/02 119/72 |
| 5,230,302 A * | 7/1993 | Steudler, Jr. | ............ | A01K 39/02 248/58 |
| 5,988,107 A * | 11/1999 | von Taschitzki | ............ | A01K 7/06 119/51.5 |

(Continued)

FOREIGN PATENT DOCUMENTS

JP    S6351990 U    4/1988

OTHER PUBLICATIONS

European Search Report for Application No. 23198960.9, dated Mar. 4, 2024.

*Primary Examiner* — Monica L Perry
*Assistant Examiner* — Maria E Graber
(74) *Attorney, Agent, or Firm* — Troutman Pepper Locke LLP (57) ABSTRACT

Support for liquid dispensers, which comprises a main body which can be coupled with a liquid dispenser and includes a main duct to allow a flow of liquids from the main body to the liquid dispenser, wherein the main body extends along a longitudinal axis from a rear side to a front side of the main body, wherein the main body is provided with a first coupling suitable to fix the support to a tube, wherein the first coupling comprises a seat suitable to surround a portion of the tube, so that the tube can move axially but not radially in the seat.

20 Claims, 7 Drawing Sheets

(56) References Cited

U.S. PATENT DOCUMENTS

| | | | |
|---|---|---|---|
| 6,003,468 A * | 12/1999 | Edstrom, Sr. | A01K 39/0213 251/339 |
| 6,308,660 B1 * | 10/2001 | Coiro, Sr. | A01K 1/031 119/419 |
| 6,382,589 B1 | 5/2002 | Edstrom, Sr. | |
| 6,418,961 B1 | 7/2002 | Edstrom, Sr. | |
| 6,619,231 B2 * | 9/2003 | Darby | A01K 39/0213 119/72 |
| 8,316,802 B2 * | 11/2012 | Hallock | A01K 1/031 119/72 |
| 8,601,980 B2 * | 12/2013 | Wacker | A01K 7/02 119/61.5 |
| 10,104,867 B2 * | 10/2018 | Gabriel | A01K 7/02 |
| 10,238,086 B2 | 3/2019 | Gabriel et al. | |
| 2007/0272165 A1 * | 11/2007 | von der Assen | A01K 39/0213 119/72 |
| 2008/0017120 A1 * | 1/2008 | Hawk | A01K 39/0213 119/72 |
| 2014/0224180 A1 | 8/2014 | Willis | |
| 2023/0263133 A1 * | 8/2023 | Wu | A01K 9/00 119/72 |

* cited by examiner

SUPPORT FOR DISPENSERS OF LIQUIDS FOR WATERING ANIMALS

CROSS-REFERENCE TO RELATED APPLICATION

This application claims priority to Italian Patent Application No. 102022000019551 filed on 23 Sep. 2022, which is hereby incorporated by reference in its entirety.

TECHNICAL FIELD

The present description relates to a support which can be coupled with a dispenser of liquids for watering animals, for example laboratory animals such as small rodents or the like.

BACKGROUND OF THE DESCRIPTION

U.S. Ser. No. 10/238,086 B2 discloses a support for liquid dispensers, which comprises a main body which can be coupled with a liquid dispenser and is provided with a first coupling which serves to fix the support to a tube of a system for watering animals contained in a laboratory cages. Such a tube generally includes an axial duct and a radial opening to allow a flow of liquids from this axial duct to a main duct of the support. The first coupling of the support includes an extension which enters the radial opening of the tube and is made in one piece with a semi-cylindrical shaped seat for the tube, so as to allow a radial movement but not an axial movement of the first coupling with respect to to the tube. Fixing the first coupling of this known support to the tube is relatively complex, as it requires the application of some additional accessories, in particular another first coupling and locking rings arranged between the two first couplings to also prevent a radial movement of the support with respect to the tube.

U.S. Pat. No. 6,418,961 B1 discloses another support for liquid dispensers, in which the main body is screwed to a first joint which is in turn screwed to a first coupling which crosses the tube and is screwed to another first joint to lock axially and radially the first coupling to the tube. This known support has the same problems as the support of U.S. Ser. No. 10/238,086 B2, namely a relatively high number of components and a liquid flow rate which is much lower than the flow rate of the tube. Furthermore, the support of U.S. Pat. No. 6,418,961 B1 requires that the tube must be crimped to fix the first coupling and the first joint to the tube.

U.S. Pat. No. 6,382,589 B1 discloses another support for liquid dispensers, in which the main body is screwed to a nipple fixed to the tube, wherein a gasket is arranged at the base of the thread of the main body, namely at the mouth of the nipple, for the liquid tightness between the nipple and the main body.

SUMMARY OF THE DESCRIPTION

Object of the present description is therefore to provide a support free from these problems. Said object is achieved with a support, the main characteristics of which are specified in the attached claims, to be considered an integral part of the present description.

Thanks to the particular structure of the first coupling, the support according to the present description can be fixed to the tube of a drinking system in a simpler and faster way than the fixing obtained with the known supports. In fact, the first coupling of the present support allows an axial movement but prevents a radial movement of the tube in the seat of the first coupling, while the axial movement can be prevented automatically when the main body is fixed to the first coupling, preferably by means of an extension which protrudes from a first joint joined to the main body.

The fixing obtained with the present support is more stable and resistant, especially if the first coupling comprises a particular seat for the tube which is preferably made in a single piece with a mouth and an inner cavity for the first joint of the main body.

The first joint of the present support is preferably made in one piece with the main body and/or is arranged in the mouth of the first coupling, so as to reduce the longitudinal size of the support with respect to the known supports. Therefore, the main body, if it is in one piece with the first joint, can be advantageously fixed to the tube by means of a single component, namely the first coupling, and a particular main gasket.

The particular connection between the first coupling and the first joint allows to widen the auxiliary duct of the first joint and consequently increase the liquid flow rate of the support towards the liquid dispenser without increasing the diameter of the tube, minimizing the pressure drops during operation with a recirculation of the watering system which includes the tube.

The first coupling preferably comprises an inner thread screwed in an outer thread of the first joint, so that the main gasket arranged between the first joint and the tube can expand into the inner cavity of the first coupling in a controlled and precise manner, since the first joint can be screwed into the first coupling only until a surface of the first coupling contacts a surface of the first joint or of the main body.

The present support is preferably provided with a particular second coupling which can also be applied to other supports, including known supports, and comprises particular retaining means for retaining a coupling of the liquid dispenser in a removable or fixed manner. These retaining means may comprise a particular retaining ring for a fixed connection or a particular elastic ring which can expand radially to ensure a stable but removable coupling with a quick coupling of the liquid dispenser. The second coupling may also comprise a particular collar which makes the mechanical coupling between the support and the liquid dispenser more stable.

The present support can also be provided with a particular sleeve and/or a particular auxiliary gasket which can also be applied to other supports, including known supports, to respectively improve the stability and/or the seal between the support and the liquid dispenser.

The present support can also comprise a mobile plunger which can also be applied to other supports, including known supports, and is provided with a particular diametral groove which allows to increase the flow rate of liquids between the support and the dispenser without compromising the seal when the plunger is pressed against the respective auxiliary seal.

The first coupling can also be made in a single piece with two mouths to connect two main bodies together, so as to obtain a support which can be easily fixed to the tube and coupled with two liquid dispensers.

Preferably, the components of the support are substantially coaxial and/or substantially symmetrical or parallel with respect to the longitudinal axis of the support, so as to simplify their manufacture and/or assembly.

Thanks to the aforementioned structural characteristics, the support also has a better liquid tightness than the known supports, so as to minimize or even eliminate losses of liquids from the support.

BRIEF DESCRIPTION OF THE DRAWINGS

Further advantages and features of the support according to the present description will become apparent to those skilled in the art from the following detailed description of some embodiments, to be considered non-limiting examples of the claims, with reference to the attached drawings in which:

EXEMPLARY EMBODIMENTS

As shown in FIGS. 1-8, a first embodiment of the support according to the present description comprises a main body 1 which includes a main duct 2 for allowing a flow of liquids towards one side of the support, in particular the front side. A liquid dispenser 3 (shown in dashed lines) for watering animals can be coupled with the main body 1 to allow a flow of liquids from the main duct 2 to a duct of the liquid dispenser 3. The main body 1 extends along a longitudinal axis A from a rear side to the front side of the main body 1. The main body 1 is provided with a first coupling 4 for fixing the support to a tube 5 which includes an axial duct 6 and a radial opening 7 for allowing a flow of liquids from the axial duct 6 of the tube 5 to the main duct 2 of the main body 1. A system for watering animals contained in laboratory cages can comprise the support and the tube 5.

The main body 1 can be joined to the first coupling 4 through a first joint 8, preferably made in one piece, in particular of stainless steel, with the main body 1, which is provided with first fastening means 9, preferably an outer thread, coupled with second fastening means 10, preferably an inner thread, of the first coupling 4, wherein these first and second fastening means are complementary and form a shape coupling, preferably reversible. In alternative embodiments the first and second fastening means may comprise snap-fit mechanisms instead of the threads.

The first joint 8 is arranged in a mouth 11 of the first coupling 4 which is provided with the second fastening means 10 and is connected by means of an inner cavity 12 to a seat 13. The seat 13 of the first coupling 4 is suitable to surround a portion of the tube 5, so that the tube 5 can move axially but not radially in the seat 13. The mouth 11, the inner cavity 12 and the seat 13 are preferably made in a single piece, in particular of stainless steel, with the first coupling 4. Preferably, the inner surface of the seat 13 has a substantially cylindrical shape with a longitudinal axis B which is substantially perpendicular to the longitudinal axis A.

Figure 3:
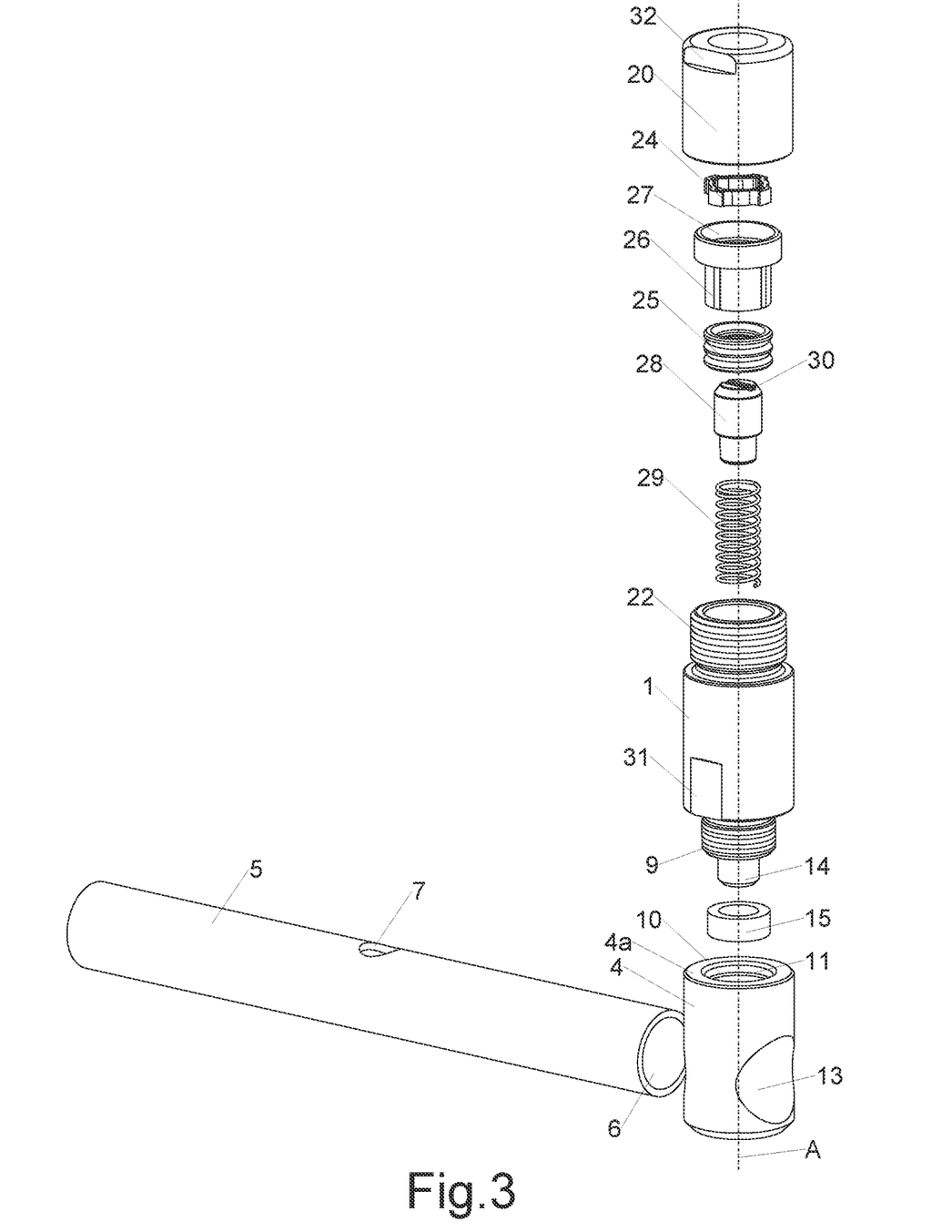
FIG. 3 is an exploded view of the support of FIG. 1.
Figure 4:
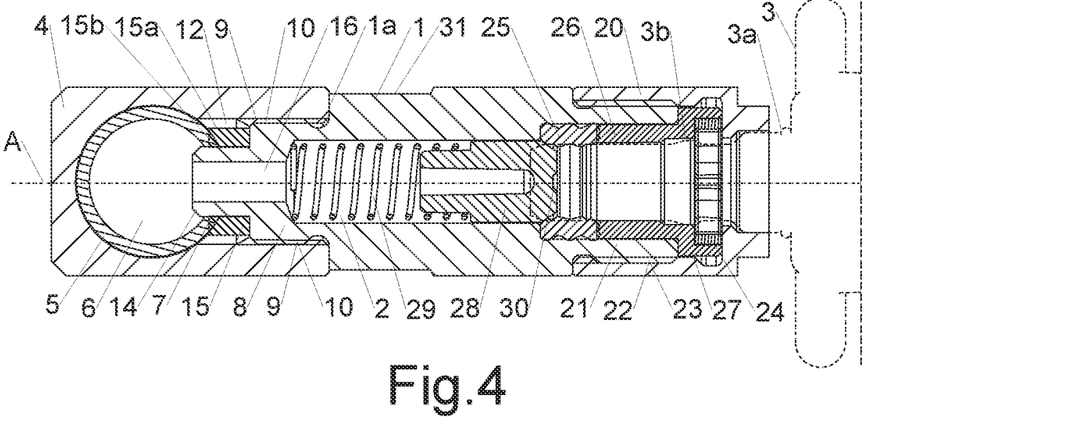
FIG. 4 is the section IV-IV of FIG. 2.
Figure 5:
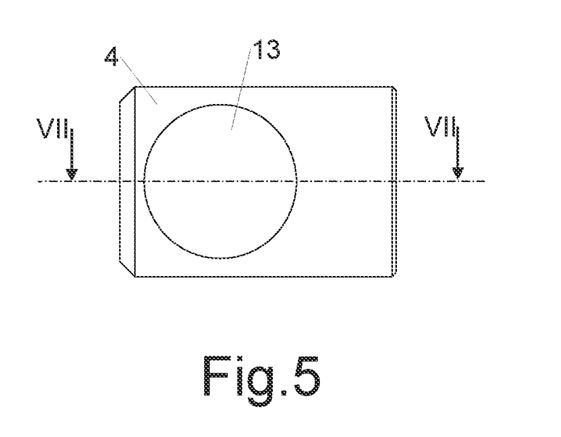
FIG. 5 is a side view of the first coupling of the support of FIG. 1.
Figure 6:
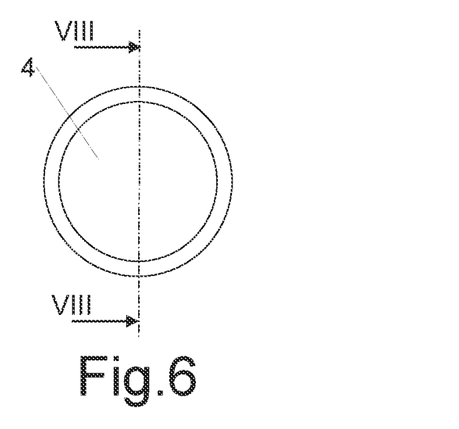
FIG. 6 is a rear view of the first coupling of FIG. 5.
Figure 7:
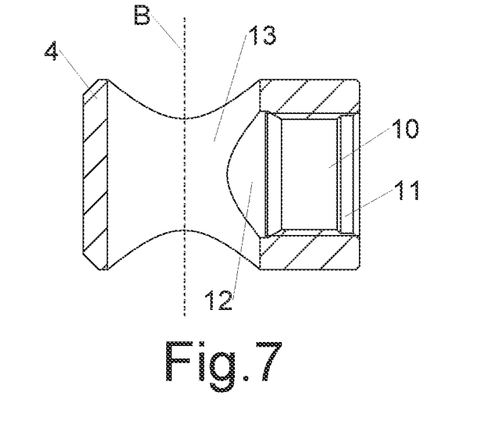
FIG. 7 is the section VII-VII of FIG. 5.
Figure 8:
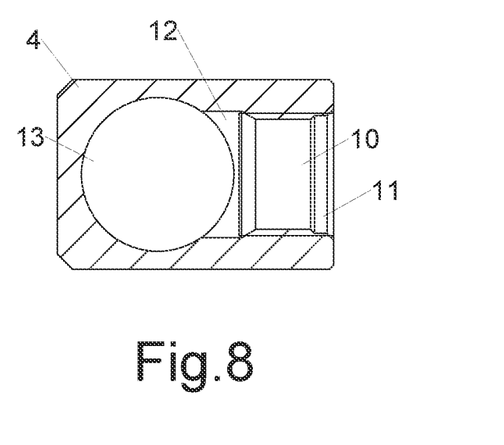
FIG. 8 is the section VIII-VIII of FIG. 6.

The main body 1, in particular the first joint 8 joined to the main body 1, is provided with an extension 14 which protrudes into the inner cavity 12 of the first coupling 4 and/or into the seat 13 of the first coupling 4, so that the extension 14 can penetrate into the radial opening 7 of the tube 5 and axially lock the tube 5 in the seat 13. A main gasket 15, in particular having a substantially cylindrical shape, is preferably arranged around the extension 14. Preferably, the radial section of the main gasket 15 has a substantially rectangular shape, wherein the longitudinal side 15a is larger than the radial side 15b.

When the tube 5 is arranged in the seat 13 of the first coupling 4, the extension 14 of the first joint 8 protrudes into the radial opening 7 and preferably also into the axial duct 6 of the tube 5, while the main seal 15 is pressed between the first joint 8 and the tube 5 to deform and expand in the inner cavity 12 until a surface 4a of the first coupling 4 abuts against a surface of the first joint 8 or of the main body 1, in particular a rear surface 1a of the main body 1. An auxiliary duct 16 crosses the first joint 8 and the extension 14, if present, to allow a flow of liquids from the axial duct 6 of the tube 5 to the main duct 2 of the main body 1.

The main body 1 may be provided with a second coupling 20, in particular a female quick coupling, which is suitable to be coupled with a complementary coupling, in particular a male quick coupling 3a, of the liquid dispenser 3. The second coupling 20 is preferably made of stainless steel. The main body 1 is joined to the second coupling 20 through a second joint 21, preferably made in a single piece with the main body 1, which is provided with first fastening means 22, preferably an outer thread, coupled with second fastening means 23, preferably an inner thread, of the second coupling 20, wherein these first and second fastening means are complementary and realize a shape coupling, preferably reversible. Retention means are preferably arranged in the second coupling 20 or in the second joint 21 to hold in a fixed or removable manner a protuberance 3b which protrudes from the quick coupling 3a of the liquid dispenser 3.

Figure 9:
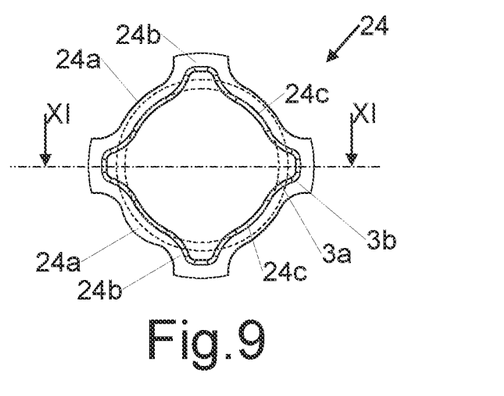
FIG. 9 is an enlarged front view of the elastic ring of the support of FIG. 1.
Figure 10:
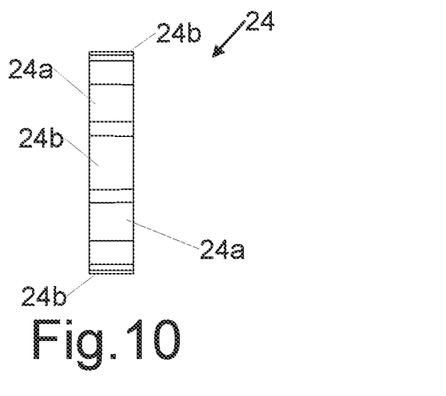
FIG. 10 is a side view of the elastic ring of FIG. 9.
Figure 11:
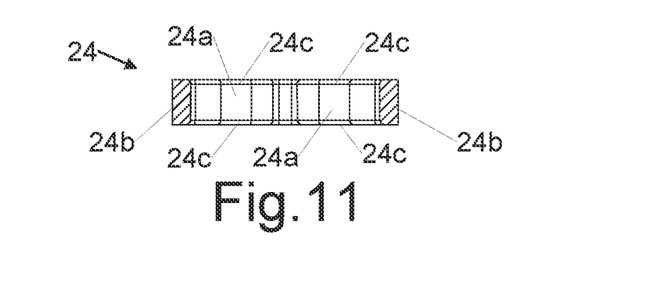
FIG. 11 is the section XI-XI of FIG. 9.
Figure 12:
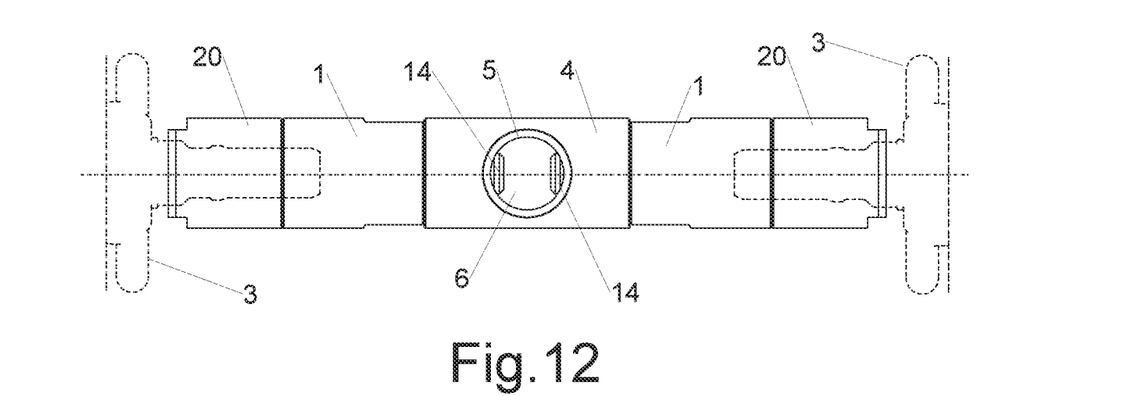
FIG. 12 is a side view of a second embodiment of the support.
Figure 13:
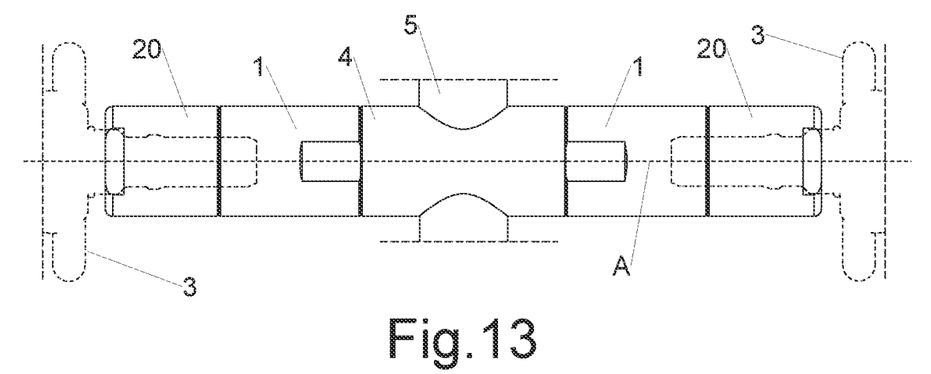
FIG. 13 is a top view of the support of FIG. 12.
Figure 14:
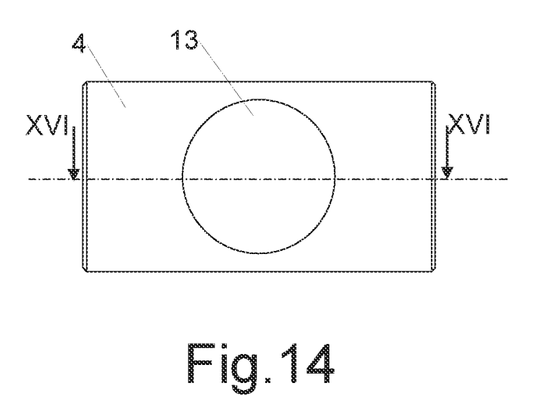
FIG. 14 is a side view of the first coupling of the support of FIG. 12.
Figure 15:
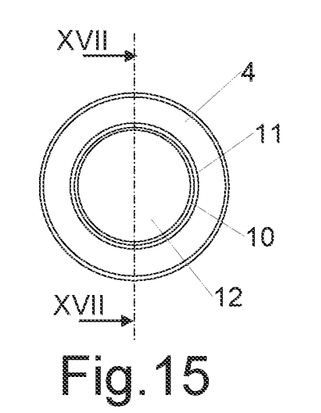
FIG. 15 is a rear view of the first coupling of FIG. 14.
Figure 16:
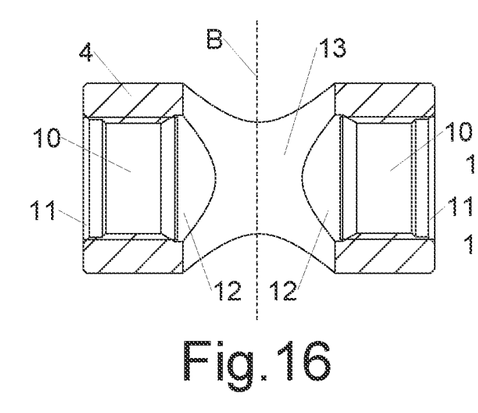
FIG. 16 is the section XVI-XVI of FIG. 14.
Figure 17:
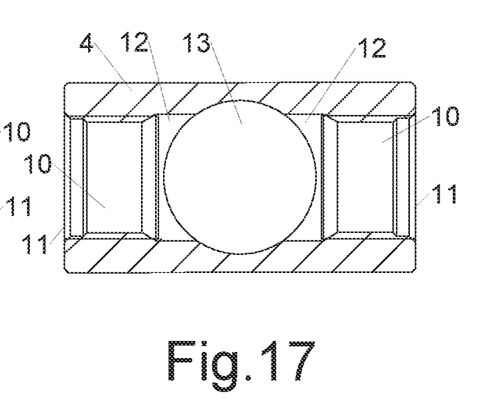
FIG. 17 is the section XVII-XVII of FIG. 15.
Figure 18:
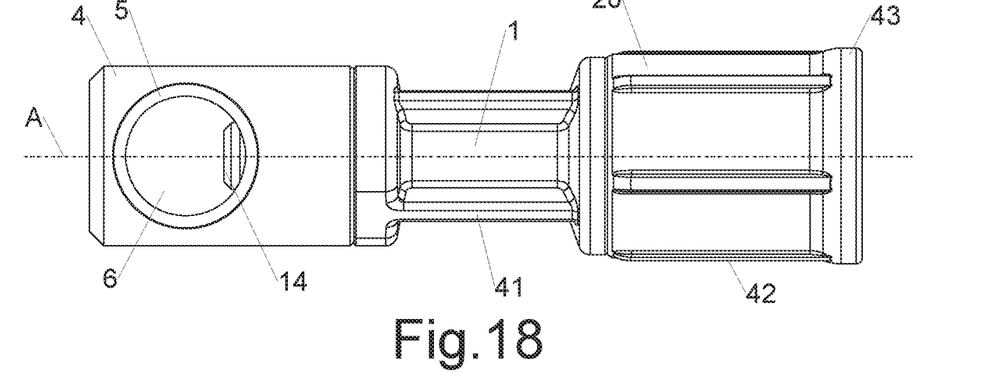
FIG. 18 is a side view of a third embodiment of the support.
Figure 19:
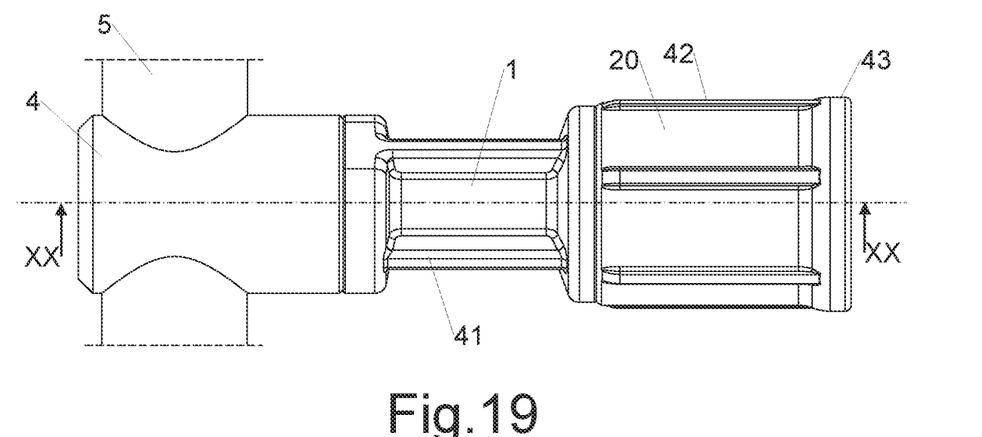
FIG. 19 is a top view of the support of FIG. 18.
Figure 20:
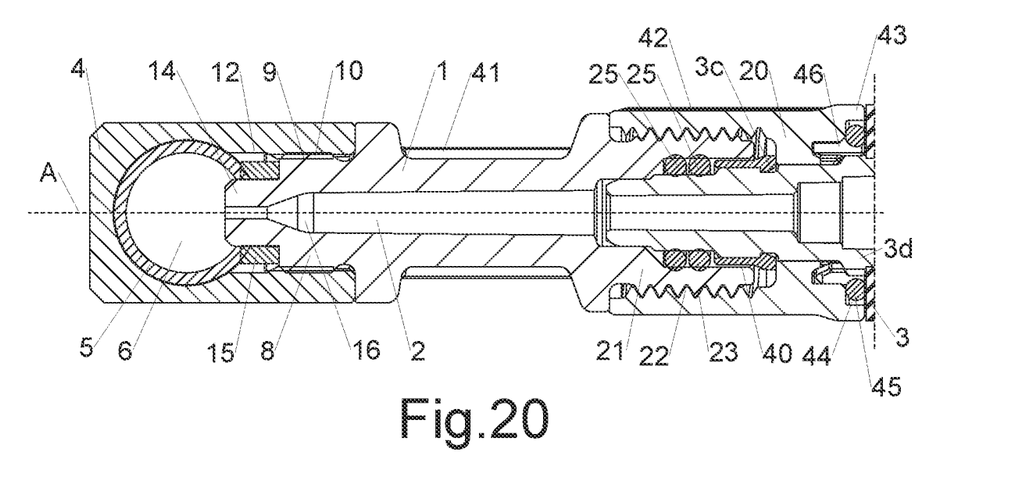
FIG. 20 is the section XX-XX of FIG. 19.
Figure 21:
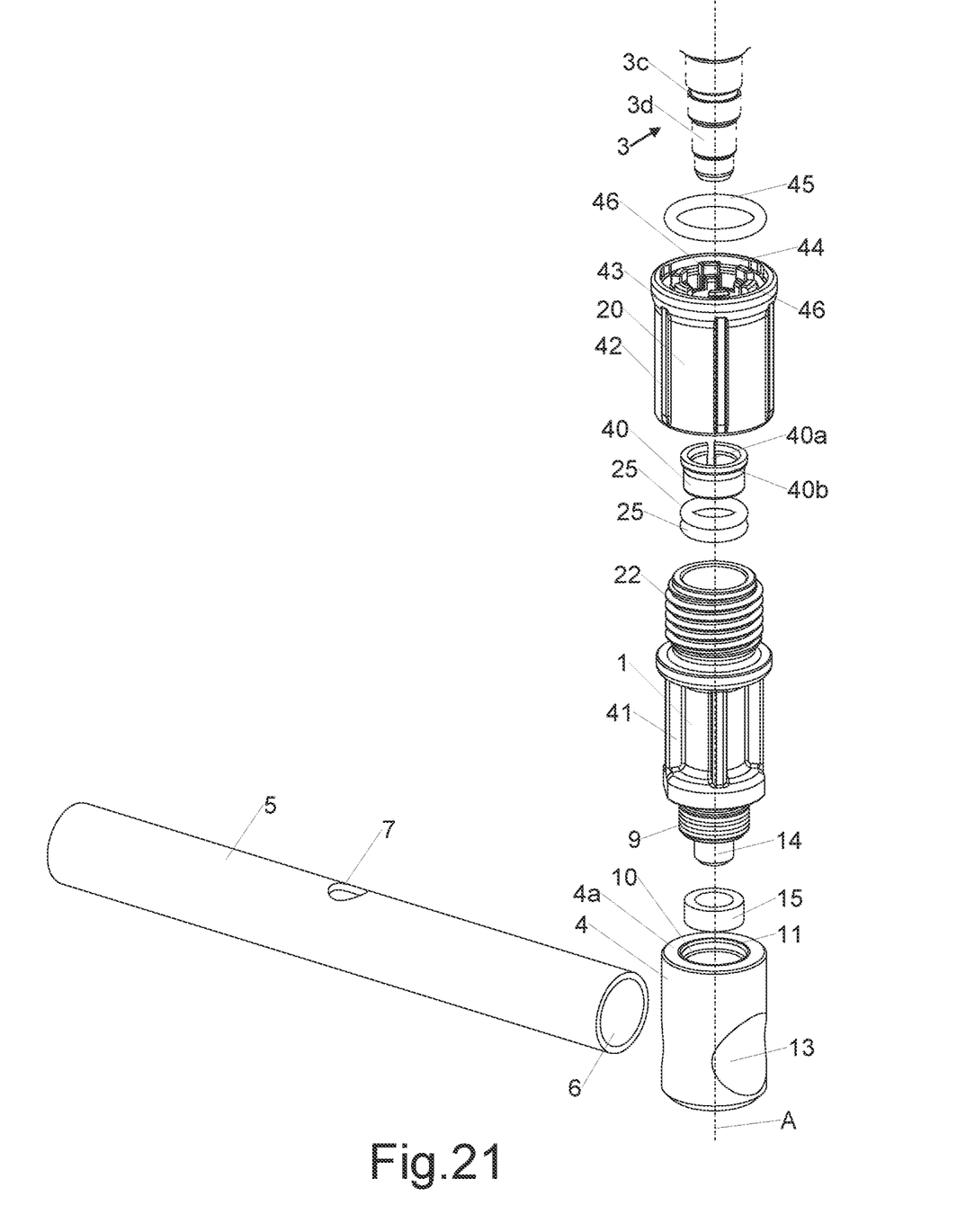
FIG. 21 is an exploded view of the support of FIG. 18.

As also shown in FIGS. 9-11, said retaining means may comprise an elastic ring 24, preferably made of plastic, having a plurality of first concave portions 24a, in particular four first concave portions 24a, which have an inner surface suitable to come into contact with an outer surface of the coupling 3a (shown with dotted lines in FIG. 9) of the liquid dispenser 3, wherein the inner edges 24c of this inner surface of the first concave portions 24a are rounded and are suitable to come into contact with a protuberance 3b which protrudes from the outer surface of the coupling 3a. The first concave portions 24a of the elastic ring 24 are arranged and joined between two second concave portions 24b, in particular four second concave portions 24b, wherein the second concave portions 24b are suitable to deform and expand elastically, during insertion, coupling and/or extraction of the coupling 3a of the liquid dispenser 3 into and/or from the second coupling 20, so that the first concave portions 24a move radially outwards to allow the protuberance 3*b* of the coupling 3*a* to pass through the elastic ring 24, to then be displaced elastically by the second concave portions 24*b* radially inwards when the protuberance 3*b* no longer urges against the elastic ring 24. Therefore, the elastic ring 24 can be in three positions: a rest position (shown in FIG. 9), when the second coupling 20 is not coupled with the coupling 3*a*, or in a coupled position, in which the second coupling 20 is coupled with the coupling 3*a*, the snap ring 24 is radially outwardly expanded and the first concave portions 24*a* urge against the outer surface of the coupling 3*a*, or in an insertion or extraction position, in which the elastic ring 24 is more radially outwardly expanded with respect to the coupling position and the first concave portions 24*a* urge against the protuberance 3*b* of the coupling 3*a* of the dispenser 3 until the coupling 3*a* is completely inserted or extracted. In this way, the first concave portions 24*a* of the elastic ring 24 can be moved radially and elastically outward or inward depending on the position or presence of the coupling 3*a* of the liquid dispenser 3 in the second coupling 20 of the support.

An auxiliary gasket 25 can be arranged in the main duct 2 of the main body 1 or in the second joint 21 to obtain liquid tightness between the coupling 3*a* of the liquid dispenser 3 and the main body 1. Preferably, the radial section of the auxiliary gasket 15 is substantially W-shaped, with the lower part of the W facing the longitudinal axis A. A sleeve 26 is preferably arranged between the elastic ring 24 and the auxiliary gasket 25, so as to lock the elastic ring 24 axially and the gasket 25 between the main body 1 and the second coupling 20. In particular, the sleeve 26 comprises a housing 27 for the elastic ring 24, which housing 27 protrudes towards the outside of the sleeve 26 and is locked axially and/or radially between the second coupling 20 and the second joint 21. A plunger 28 can be arranged in the main duct 2 and be pushed by elastic means 29, in particular a helical spring, towards the auxiliary gasket 25, so that the coupling 3*a*, when it is inserted in the second coupling 20, urges the plunger 28 and overcomes the force exerted by the elastic means 29, to allow a flow of liquids between the main duct 2 of the main body 1 and the coupling 3*a* of the liquid dispenser 3. A portion of the plunger 28 suitable for coming into contact with the auxiliary gasket 25 preferably has a substantially frustoconical shape with a diametral groove 30 which is made in the minor base of the conical frustum and faces the auxiliary gasket 25.

Figure 1:
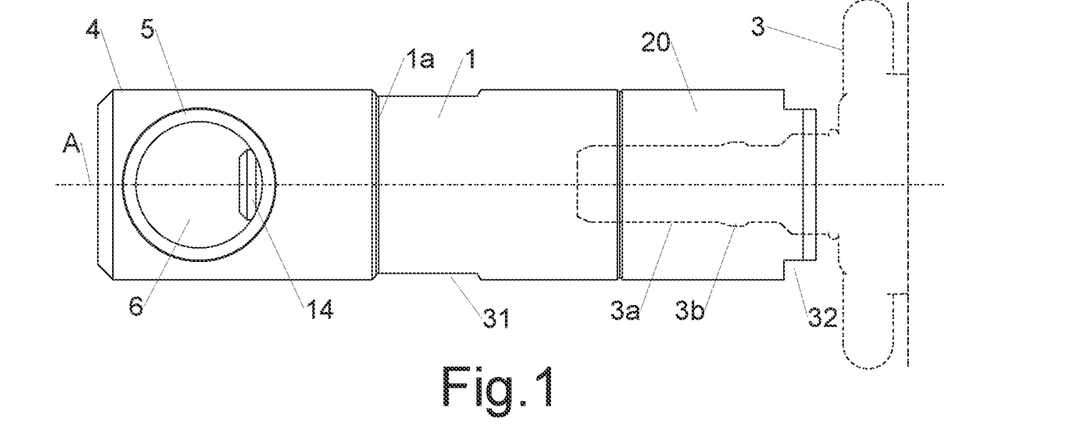
FIG. 1 is a side view of a first embodiment of the support.
Figure 2:
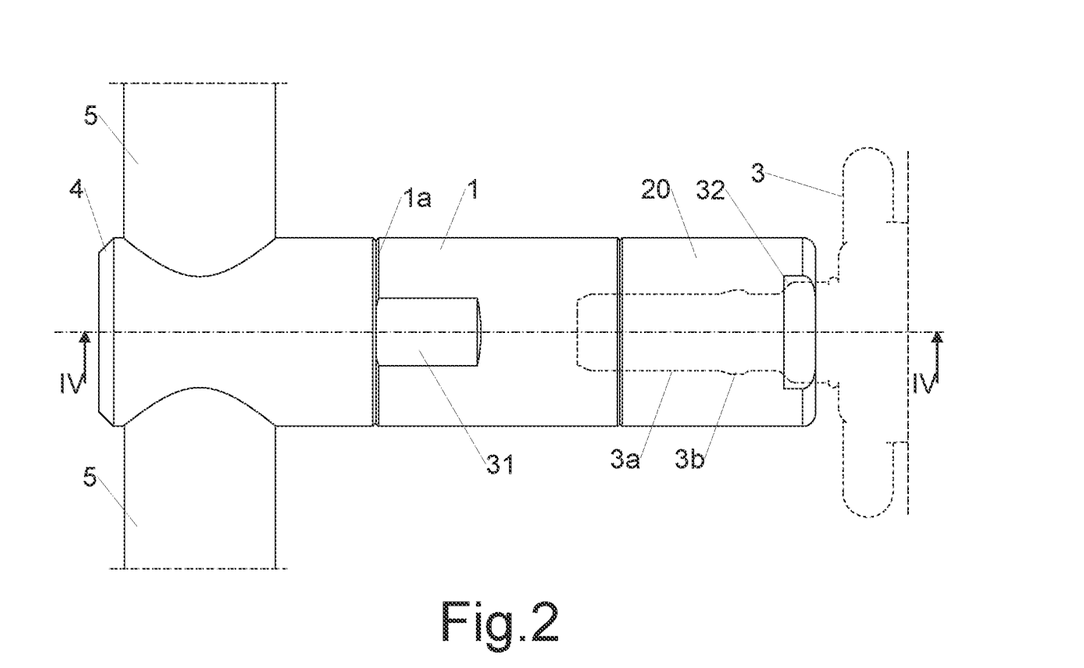
FIG. 2 is a top view of the support of FIG. 1.

Preferably, the outer peripheral surfaces of the main body 1, of the first coupling 4 and/or of the second coupling 20 are substantially cylindrical and have substantially the same diameter. The outer peripheral surfaces of the main body 1 and/or of the second coupling 20 may also be provided with recesses 31, 32 or protuberances for a form-fit with tools, for example a wrench, to rotate the main body 1 and/or the second coupling 20 around the longitudinal axis A.

As shown in FIGS. 12-17, a second embodiment of the support according to the present description comprises two main bodies 1 which are substantially the same as the main body 1 of the first embodiment and include a main duct 2 for allowing a flow of liquids towards a front side and towards a rear side of the support. A liquid dispenser 3 (shown with dashed lines) can be coupled with either main body 1, for example by means of a second coupling 20 which is substantially the same as the second coupling 20 of the first embodiment, to allow a flow of liquids from either main duct 2 to a duct of the liquid dispenser 3. Either main body 1 extends along a longitudinal axis A towards the rear side or towards the front side of the support. The main bodies 1 are connected to each other by a first coupling 4 suitable to fix the support to a tube 5 which includes an axial duct 6 and two radial openings 7 to allow a flow of liquids from the axial duct 6 of the tube 5 to the main ducts 2 of the main bodies 1.

The first coupling 4 comprises a seat 13 for the tube 5, which is arranged between two mouths 11 for the first joints 8 of the two supports and between two inner cavities 12 for two main gaskets 15. The mouths 11, the inner cavities 12 and the seat 13 of the first coupling 4 are arranged along the longitudinal axis A. The first joints 8 of the two supports are preferably made in a single piece with the respective main bodies 1, which are provided with first fastening means 9, preferably an outer thread, coupled with second fastening means 10, preferably an inner thread, of the first coupling 4, wherein these first and second fastening means are complementary and carry out a form-fit, preferably reversible. Therefore, the second embodiment of the support comprises a first coupling 4 which allows to connect to the tube 5 two main bodies 1 of two supports substantially identical to the first embodiment of the support, which differ only for the first coupling 4, which is single, namely with one mouth 11, in the first embodiment and double, namely with two mouths 11, in the second embodiment.

As shown in FIGS. 18-21, a third embodiment of the support according to the present description is similar to the first embodiment but the retaining means arranged in the second coupling 20 or in the second joint 21 comprise a retaining ring 40, in particular an elastic sleeve with a longitudinal slot 40*a* and a peripheral protuberance 40*b* which is suitable to be inserted in a perimetric groove 3*c* of a coupling 3*d*, in particular a male coupling, of a liquid dispenser 3. Therefore, when the second coupling 20 is joined, in particular screwed, to the main body 1, the coupling 3*d* of the liquid dispenser 3 is locked in a fixed manner in the second coupling 20 by means of the retaining ring 40 and can be extracted from the body main 1 only by removing the second coupling 20.

The outer peripheral surfaces of the main body 1 and/or of the second coupling 20 may be provided with ribs 41, 42 and/or recesses for manually rotating the main body 1 and/or the second coupling 20 around the longitudinal axis A. One or several auxiliary gaskets 25, in particular two O-rings, are arranged in the second joint 21 to obtain a liquid tightness between the coupling 3*d* of the liquid dispenser 3 and the main body 1. The second coupling 20 may be provided with a collar 43, in particular made in a single piece with the second coupling 20. The collar 43 comprises a central cavity 44 which can house an auxiliary gasket 45 suitable to be pressed between the collar 43 and a surface of the liquid dispenser 3 facing towards the support. The collar 43 may be provided with a plurality of ribs 46 which protrude into the central cavity 44 of the collar 43 to engage with complementary elements of the dispenser 3.

Preferably, the main body 1, the main duct 2, the first coupling 4 (excluding the seat 13), the first joint 8, the mouth 11, the inner cavity 12, the extension 14, the main gasket 15, the duct auxiliary 16, the second coupling 20, the second joint 21, the elastic ring 24, the auxiliary gasket 25, the sleeve 26, the housing 27, the plunger 28, the elastic means 29, the collar 43 and/or the central cavity 44 are substantially coaxial and/or substantially symmetrical to the longitudinal axis A, while the ribs 41, 42 and/or 46 are substantially parallel to the longitudinal axis A.

Further embodiments of the support according to the present description can comprise a double first coupling 4 coupled with two different main bodies 1 and/or two different second couplings 20.

Variations or additions can be made by those skilled in the art to the embodiments described and illustrated herein while remaining within the scope of the following claims. In particular, further embodiments can comprise the technical features of one of the following claims with the addition of one or more technical features described in the text or illustrated in the drawings, taken individually or in any reciprocal combination and including their equivalent characteristics.

Furthermore, the terms "a/an/one", "two", etc. in the description and in the claims mean respectively "at least one", "at least two", etc., unless otherwise specified. Similarly, angles, proportions and values mentioned in the text and/or shown in the drawings include a tolerance of at least 5%, again unless otherwise specified.

We claim:

1. A support for liquid dispensers comprising:
a main body which can be coupled with a liquid dispenser,
wherein the main body includes a main duct to allow a flow of liquids from the main body to the liquid dispenser,
wherein the main body extends along a longitudinal axis from a rear side to a front side of the main body,
wherein the main body is provided with a first coupling suitable to fix the support to a tube,
wherein the first coupling comprises a seat suitable to surround a portion of the tube, so that the tube can move axially but not radially in the seat,
wherein the main body is provided with a second coupling which is suitable to be coupled with a coupling of the liquid dispenser,
wherein the main body is joined to the second coupling through a second joint which is provided with a first fastening device coupled with a second fastening device of the second coupling,
wherein the first and second fastening devices are complementary and provide a form-fit connection,
wherein a retaining device is arranged in the second coupling or in the second joint to retain in a removable manner the coupling of the liquid dispenser,
wherein said retaining device comprises an elastic ring having a plurality of first concave portions which have an inner surface suitable to come into contact with an outer surface of the coupling of the liquid dispenser,
wherein inner edges of this inner surface of the first concave portions are rounded,
wherein the first concave portions of the elastic ring are arranged and joined between two second concave portions which are suitable to deform and expand elastically, during insertion, coupling and/or extraction of the coupling of the liquid dispenser in and/or from the second coupling of the support, so that the first concave portions can be radially and elastically displaced outwards or inwards according to the position or presence of the coupling of the liquid dispenser in the second coupling of the support.

2. The support according to claim 1, wherein an inner surface of the seat of the first coupling has a substantially cylindrical shape with a longitudinal axis which is substantially perpendicular to the longitudinal axis of the main body.

3. The support according to claim 1, wherein a plunger is arranged in the main duct and is urged by an elastic device towards an auxiliary gasket, and
wherein a portion of the plunger suitable to come into contact with the auxiliary gasket has a substantially frustoconical shape with a diametrical groove which is formed in the minor base of the conical frustum and faces the auxiliary gasket.

4. The support according to claim 1, wherein the second coupling is provided with a collar which comprises a central cavity and a plurality of ribs protruding into the central cavity.

5. The support according to claim 1, wherein the main body further comprises two main bodies connected to each other by the first coupling,
wherein the seat of the first coupling is arranged between two mouths and between two inner cavities of the first coupling, and
wherein the mouths, the inner cavities and the seat of the first coupling and the main bodies are arranged along the longitudinal axis.

6. The support according to claim 1, wherein the main body, the main duct, the first coupling excluding the respective seat, the second coupling and/or the second joint are substantially coaxial and/or substantially symmetrical to the longitudinal axis.

7. The support according to claim 1, wherein the elastic ring can be in three positions: a rest position when the second coupling is not coupled with the coupling, or in a coupled position, in which the second coupling is coupled with the coupling, the elastic ring is radially outwardly expanded and the first concave portions urge against the outer surface of the coupling, or in an insertion or extraction position, in which the elastic ring is more radially outwardly expanded with respect to the coupling position and the first concave portions urge against a protuberance of the coupling of the liquid dispenser until the coupling is completely inserted or extracted.

8. The support according to claim 1, wherein the main body is provided with an extension which protrudes into the seat of the first coupling, so that the extension can penetrate into a radial opening of the tube and axially lock the tube in the seat.

9. The support according to claim 8, wherein a main gasket is arranged around the extension, so that, when the tube is arranged in the seat of the first coupling, the main gasket is pressed between the main body and the tube to deform and expand into an inner cavity of the first coupling.

10. The support according to claim 9, wherein the main gasket has a substantially cylindrical shape, and the radial section of the main gasket has a substantially rectangular shape with the longitudinal side being greater than the radial side.

11. The support according to claim 9, wherein the main body, the main duct, the first coupling excluding the respective seat, the extension, the inner cavity and/or the main gasket are substantially coaxial and/or substantially symmetrical to the longitudinal axis.

12. The support according to claim 8, wherein the main body, the main duct, the first coupling excluding the respective seat, and/or the extension are substantially coaxial and/or substantially symmetrical to the longitudinal axis.

13. The support according to claim 1, wherein the main body is joined to the first coupling through a first joint which is provided with a first fastening device coupled with a second fastening device of the first coupling, and wherein these first and second fastening devices are complementary and provide a form-fit connection, and
wherein the first joint is arranged in a mouth of the first coupling which is provided with the second fastening device.

14. The support according to claim 13, wherein said first fastening device comprises an outer thread of the first joint and said second fastening device comprises an inner thread of the first coupling.

15. The support according to claim 13, wherein the first joint is made in a single piece with the main body.

16. The support according to claim 13, wherein the main body, the main duct, the first coupling excluding the respective seat, the first joint and/or the mouth are substantially coaxial and/or substantially symmetrical to the longitudinal axis.

17. The support according to claim 1, wherein a sleeve is arranged between the elastic ring and an auxiliary gasket arranged in the main duct of the main body or in the second joint, so that the sleeve axially locks the elastic ring and the auxiliary gasket between the main body and the second coupling.

18. The support according to claim 17, wherein the main body, the main duct, the first coupling excluding the respective seat, the second coupling, the second joint, the elastic ring, the auxiliary gasket and/or the sleeve are substantially coaxial and/or substantially symmetrical to the longitudinal axis.

19. The support according to claim 17, wherein the sleeve comprises a housing for the elastic ring, which housing protrudes towards the outside of the sleeve and is locked axially and/or radially between the second coupling and the second joint.

20. The support according to claim 17, wherein the radial section of the auxiliary gasket is substantially W-shaped, with the lower part of the W facing the longitudinal axis.

* * * * *